June 23, 1942.  J. T. REDMON  2,287,132
STORAGE BATTERY
Filed Dec. 29, 1939
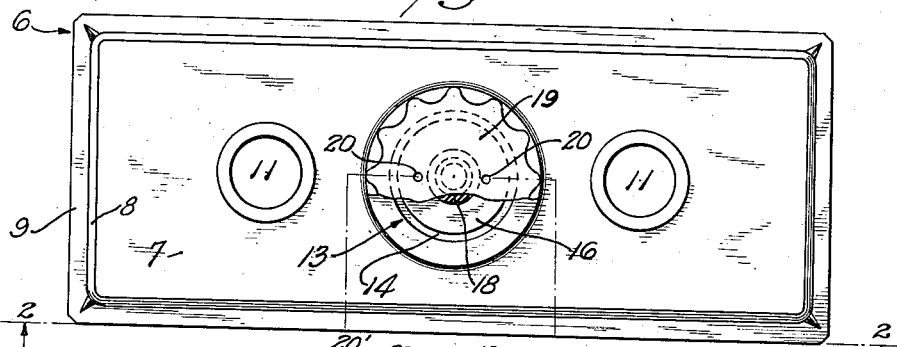
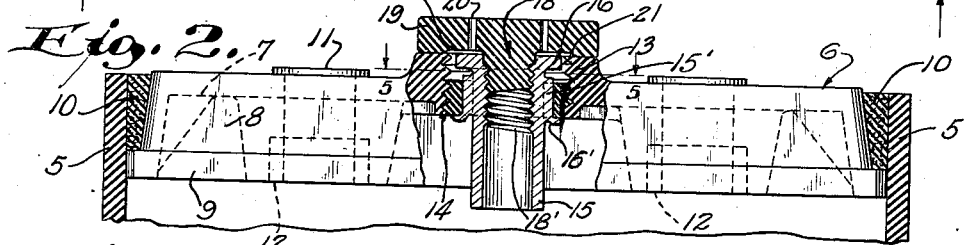
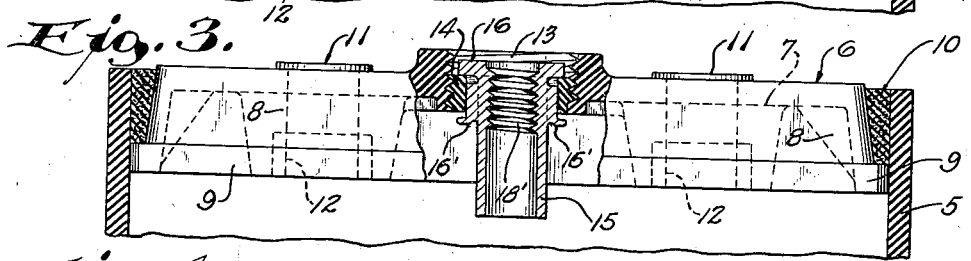
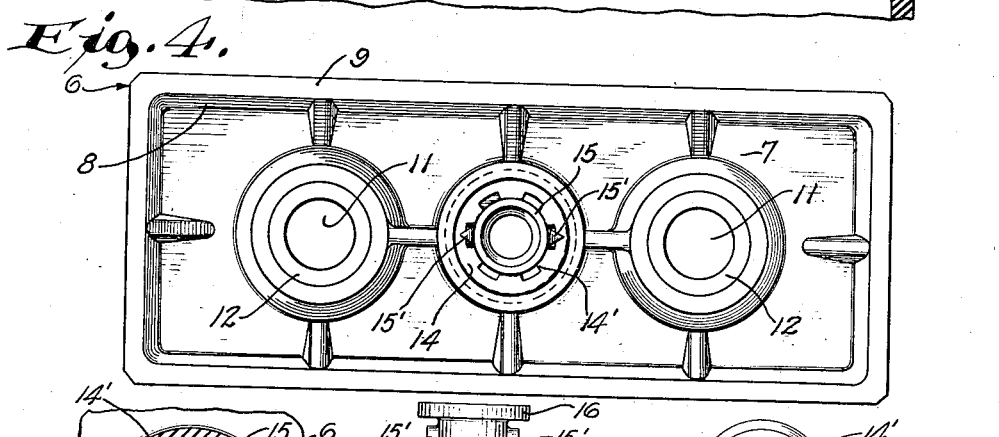
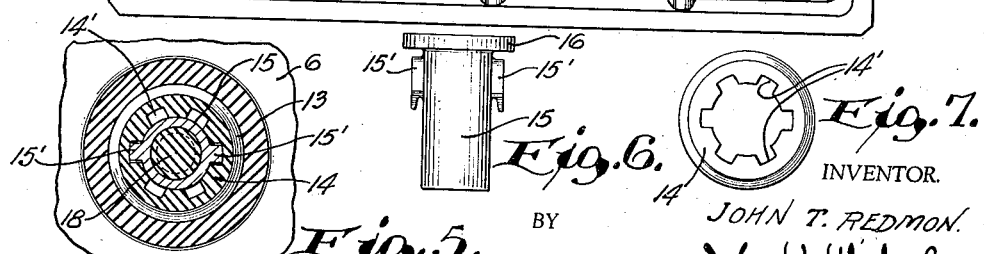
INVENTOR.
JOHN T. REDMON.
BY
John W. Michael
ATTORNEY.

Patented June 23, 1942

2,287,132

UNITED STATES PATENT OFFICE 2,287,132

STORAGE BATTERY

John T. Redmon, Memphis, Tenn., assignor to Globe-Union Inc., Milwaukee, Wis., a corporation of Delaware Application December 29, 1939, Serial No. 311,492

3 Claims. (Cl. 136—178)

This invention relates in general to storage batteries, and more particularly to an improved venting and filling structure embodied in or combined with the cover of the storage battery.

One of the objects of the present invention is to simplify and compact, as well as improve the effectiveness of a filling and venting structure for storage battery covers of the type wherein a liquid seal or liquid level limiting means is operative when the vent cap or plug is removed when adding water to replace evaporation losses, and yet the battery is effectively vented when the vent cap or closure is applied to the cover.

Another object of the invention is to provide a filling and venting structure of this character which is so constructed and organized as to be adapted to be applied to present standard storage battery covers or to be incorporated in a complete storage battery after its covers have been assembled and sealed.

Other objects and advantages reside in certain novel features of the construction, arrangement, and combination of parts, which will be hereinafter more fully described and particularly pointed out in the appended claims, reference being had to the accompanying drawing forming a part of this specification, and in which:

Figure 1 is a view in top plan showing a battery cover embodying the present invention, a portion of the vent cap or closure being broken away for the sake of illustration.

Figure 2 is a view partly in side elevation and partly in vertical cross section, this view being taken along line 2—2 of Figure 1 and looking in the direction of the arrows, and showing the parts in the position which they assume when the vent cap or closure is applied to the cover.

Figure 3 is a view similar to Figure 2 but illustrating the vent cap or closure removed, and showing the parts as they are positioned when the liquid level limiting means is effective or operative;

Figure 4 is a view in bottom plan of the cover shown in Figures 1 to 3;

Figure 5 is a fragmentary view in horizontal cross section taken on line 5—5 of Figure 2;

Figure 6 is a detail view in side elevation showing the combined filling tube and valve; and Figure 7 is a detail view in top plan showing the valve seat.

Referring to the drawing, the numeral 5 designates the case or storage battery, which contains the electrolyte, the plates, and all of the conventional structure which go to make up a standard storage battery.

A battery cover 6 is provided and has a plate-like top portion 7 formed with a downwardly and outwardly sloping side portion 8 terminating in an outturned flange 9. The cover 6 fits in the upper end of the battery case, and a sealing compound 10 is placed in the recess between the side 8 of the cover, flange 9, and the adjacent part of the storage battery case.

At appropriate points the battery cover is formed with openings 11 equipped with rubber bushings 12 through which the posts (not shown) of the battery extend.

Centrally the cover 6 is provided with an opening 13, and a portion of the cover around the opening is preferably thickened or flanged to strengthen it and better adapt it to serve its intended purposes. The opening 13 is internally threaded to receive an externally threaded annular valve seat 14. A filling tube 15 extends down through the annular valve seat, and at its upper end has an integral outwardly directed annular flange providing a valve member 16. The valve member 16 and its integral filling tube 15 are constituted of metal, preferably some soft metal, such as lead, or a suitable soft metal alloy, or other suitable material.

Below the valve member 16 the filling tube 15 is provided with integral keys or splines 15' which extend longitudinally of the tube for a portion of its length and project outwardly therefrom at diametrically opposite portions thereof. In the assembly the keys or splines 15' are slidably interfitted with keyways or guide grooves 14' provided in the valve seat 14 and opening out through the inner periphery thereof. In the construction shown there are two keys or splines 15' on the filling tube and six keyways or guide grooves 14' in the valve seat 14. The two keys or splines 15' are selectively engageable with any two diametrically opposite keyways or guide grooves 14' of the valve seat. The lower ends of the keys or splines 15' are undercut, as shown in Figure 6, and after the filling tube 15 is assembled with the valve seat 14, these undercut lower ends of the keys or splines 15' are upset to provide stop lugs 16' to limit the extent to which the combined filling tube 15 and valve 16 may move upwardly relative to the valve seat, and hence prevent accidental disassembly of these parts.

The manner in which the combined filling tube 15 and valve 16 are assembled thus restrains them against relative rotation, but leaves them free for limited relative longitudinal or axial movement so that the combined filling tube 15 and valve 16 may move from the position shown in Figure 3 to the position shown in Figure 2, and vice versa.

The unoccupied grooves 14' form vent passages around the tube 15 when the valve 16 is raised off of its seat 14, but when the valve 16 is in the position shown in Figure 3, the upper ends of the guide grooves 14' are closed or sealed off by the engagement of the annular valve 16 with its valve seat 14.

The filling tube 15 is provided with internal threads 18' designed to co-act with a screw 18, which is integral with and depends from the vent cap or closure 19. The vent cap or closure 19 is provided with vent holes 20 extending vertically therethrough and vent grooves 20' on its underside, the vent grooves 20' leading from points beyond the outer periphery of the valve 16 to the vent holes 20 so that the grooves 20' and holes 20 establish communication between the space 21 above the valve seat 14 and the atmosphere. With this construction, when the cap 19 is removed, the valve 16 automatically seats upon the influence of its own weight and that of the filling tube 15 so that the lower end of the tube 15 then determines the upper limit or highest level of electrolyte which may be poured through the tube into the interior of the battery. The tube 15 traps the air under the cover and provides a very practical way of preventing overfilling of the battery. However, when the cap is applied, as shown in Figure 2, this screw 18 pulls the tube 15 upwardly to lift the valve 16 off of its seat 14 and allow for venting of the battery to the atmosphere through guide grooves 14', around the raised valve 16 and through space 21 and vent grooves 20' and vent holes 20 to the atmosphere.

One of the important features of the invention resides in the provision of a soft metal valve member of annular form biased to closed position by its own weight and automatically lifted to open position by the application of the vent cap or plug. Of course, a filling tube in some form must be provided, but it is not essential that it be made integral with the valve, although of course this is advantageous in supplying additional bias to the valve, and in simplifying and compacting the structure.

The broad aspects of the present invention contemplates that the filling tube may be separate from the valve and fixedly supported in any suitable way. As for example, it may be fixedly secured to and depend from the battery cover. Where the filling tube is made separate from the valve, then the valve is constituted as a separate annulus, which, however, is biased by its own weight to close the vent passage between the under side of the battery cover and the atmosphere. Of course, with a separate valve some means is provided between the vent cap or plug and the valve to shift it automatically to open position when the vent cap is applied, and to release it for movement to closed position when the vent cap is removed. This means need not necessarily take the form of a screw on the vent cap or plug and screw threads on the valve, but any equivalent and suitable means may be employed to effect this purpose. It is to be understood, however, that the particular construction shown possesses its own unique advantages, but the broader aspects of the invention have been sounded in order to point to what I regard as the essential features of the broader phases of the invention.

While I have shown and described one construction in which the invention may be advantageously embodied, it is to be understood that the construction shown has been selected merely for the purpose of illustration or example and that various changes in the size, shape, and arrangement of the parts may be made without departing from the spirit of the invention.

I claim:

1. A storage battery comprising a case, a cover for the case having an internally threaded vent and filling opening therethrough, an externally threaded annular valve seat interthreaded with said opening and having an upwardly facing valve seat disposed below the top of said opening, said valve seat having a plurality of inwardly opening keyways extending from top to bottom thereof, a filling tube extending loosely through the valve seat and terminating at its inner end below the underside of the cover, an annular valve integral with the upper end of said tube and engageable with the upwardly facing valve seat to close off communication between the interior of the battery and the atmosphere except through said filling tube, said filling tube having a number of splines on its outer periphery slidably interfitted with certain of the keyways of the valve seat to hold the tube against rotation while leaving it free to move axially, the number of splines of the tube being less than the number of keyways so that when the valve is raised off of its seat the battery will be vented to the atmosphere through the unoccupied keyways, a cap for closing the upper end of said venting and filling opening and having vent holes therein, and a screw carried by and depending from the cap, said tube having internal threads engageable with said screw when the cap is applied whereby to lift the valve from its seat and provide for venting of the battery, said valve closing by gravity when the cap and screw are removed.

2. A storage battery comprising a case, a cover for the case having an internallly threaded vent and filling opening therethrough, an externally threaded annular valve seat interthreaded with said opening and having an upwardly facing valve seat disposed below the top of said opening, said valve seat having a plurality of inwardly opening keyways extending from top to bottom thereof, a filling tube extending loosely through the valve seat and terminating at its inner end below the underside of the cover, an annular valve integral with the upper end of said tube and engageable with the upwardly facing valve seat to close off communication between the interior of the battery and the atmosphere except through said filling tube, said filling tube having a number of splines on its outer periphery slidably interfitted with certain of the keyways of the valve seat to hold the tube against rotation while leaving it free to move axially, the number of splines on the tube being less than the number of keyways so that when the valve is raised off of its seat the battery will be vented to the atmosphere through the unoccupied keyways, a cap for closing the upper end of said venting and filling opening and having vent holes therein, and a screw carried by and depending from the cap, said tube having internal threads engageable with said screw when the cap is applied whereby to lift the valve from its seat and provide for venting of the battery, said valve closing by gravity when the cap and screw are removed, said splines having outturned projections at their lower ends engageable with the underside of the valve seat to limit the upward movement of the valve.

3. A storage battery comprising a case, an internally threaded opening for said case, a filling tube and vent valve assembly fitted into said opening as a unit and comprising, an annular member having external threads interthreaded with said opening, said member having a vent extending vertically from the top to bottom thereof, a filling tube slidably fitted in said member and having its lower end extending substantially below the opening in the case, said tube having a radial flange at its upper end extending over the top opening of said vent and adapted to seat upon and close said vent when said tube is urged downwardly by gravity, means acting between said tube and said member to resist relative rotation thereof while permitting relative axial movement, and a cap having a vent hole therein for closing said opening, said cap and said tube having interengaging screw means to lift said tube and open the vent in said member as said cap is brought into closing contact with said opening.

JOHN T. REDMON.